United States Patent
Geng (10) Patent No.: US 12,052,101 B2
(45) Date of Patent: Jul. 30, 2024

(54) DATA RETRANSMISSION METHOD AND APPARATUS

(71) Applicant: Huawei Technologies Co., Ltd., Shenzhen (CN)

(72) Inventor: Ruiquan Geng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 360 days.

(21) Appl. No.: 17/534,609

(22) Filed: Nov. 24, 2021

(65) Prior Publication Data

US 2022/0085917 A1 Mar. 17, 2022

Related U.S. Application Data

(63) Continuation of application No. PCT/CN2020/075249, filed on Feb. 14, 2020.

(30) Foreign Application Priority Data

May 28, 2019 (CN) .......................... 201910452640.9

(51) Int. Cl.
*H04L 1/08* (2006.01)
*H04L 1/1607* (2023.01)
*H04L 5/00* (2006.01)

(52) U.S. Cl.
CPC .............. *H04L 1/1642* (2013.01); *H04L 1/08* (2013.01); *H04L 5/0053* (2013.01)

(58) Field of Classification Search
CPC ........ H04L 1/1642; H04L 1/08; H04L 5/0053
(Continued)

(56) References Cited

U.S. PATENT DOCUMENTS

| 7,496,038 B2 | 2/2009 | Krishna et al. |
| 8,341,272 B2 | 12/2012 | Kleo |

(Continued)

FOREIGN PATENT DOCUMENTS

| CN | 1825846 A | 8/2006 |
| CN | 1983911 A | 6/2007 |

(Continued)

OTHER PUBLICATIONS

"Setting of ACK_SN for Partial Status Reports," Agenda Item: 5.1.2.4, Source: Ericsson, Document for: Discussion, Decision, 3GPP TSG-RAN WG2#62, R2-082158, Kansas City, USA, May 5-9, 2008, 2 pages.

(Continued)

*Primary Examiner* — Sibte H Bukhari
(74) *Attorney, Agent, or Firm* — SLATER MATSIL, LLP (57) ABSTRACT

A data retransmission method and apparatus, the method including receiving, by a base station, first acknowledgement sequence number (ACK-SN) information sent by a terminal, where the first ACK-SN information is disposed in a status report, and where the first ACK-SN information carries a sequence number of a first data packet, recording, by the base station, the first ACK-SN information and a quantity of times the first ACK-SN information is received, and retransmitting, by the base station, the first data packet to the terminal based on the first ACK-SN information in response to the quantity of times the first ACK-SN information is received accumulatively reaching a preset value, where the preset value is less than or equal to a maximum quantity of retransmissions.

20 Claims, 3 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2007/0133414 | A1 | 6/2007 | Krishna et al. |
| 2011/0041024 | A1* | 2/2011 | Burbidge .............. H04L 1/1628 |
| | | | 714/E11.113 |
| 2012/0102216 | A1 | 4/2012 | Cui |
| 2015/0215987 | A1* | 7/2015 | Kim ...................... H04W 76/20 |
| | | | 370/329 |

FOREIGN PATENT DOCUMENTS

| | | |
|---|---|---|
| CN | 101682611 A | 3/2010 |
| CN | 102098150 A | 6/2011 |
| CN | 102957522 A | 3/2013 |
| CN | 106330412 A | 1/2017 |
| EP | 337072 A1 | 6/2018 |
| JP | 2012044278 A | 3/2012 |

OTHER PUBLICATIONS

"3rd Generation Partnership Project; Technical Specification Group Radio Access Network; Evolved Universal Terrestrial Radio Access (E-UTRA); Radio Link Control (RLC) protocol specification (Release 15)," 3GPP TS 36.322 V15.1.0, Jul. 2018, 45 pages.

"More Efficient RLC Status Reporting," Agenda item: 5.1.2.4, Source: Sunplus mMobile Inc., Document for: Discussion and Decision, 3GPP TSG-RAN WG2 Meeting #60bis, R2-080404, Sevilla, Spain, Jan. 14-18, 2008, 5 pages.

"RLC Status Report Format," Agenda Item: 10.3.2.3, Source: Ericsson, Document for: Discussion, Decision, 3GPP TSG-RAN WG2 #99, Tdoc R2-1708339, Berlin, Germany, Aug. 21-25, 2017, 3 pages.

* cited by examiner

DATA RETRANSMISSION METHOD AND APPARATUS

CROSS-REFERENCE TO RELATED APPLICATIONS

This application is a continuation of International Application No. PCT/CN2020/075249, filed on Feb. 14, 2020, which claims priority to Chinese Patent Application No. 201910452640.9, filed on May 28, 2019. The disclosures of the aforementioned applications are hereby incorporated by reference in their entireties.

TECHNICAL FIELD

This application relates to the communication field, and in particular, to a data retransmission method and apparatus.

BACKGROUND

With rapid development of Internet technologies, the Internet of Things emerges. Currently, the Internet of Things has been extended from smart household to various fields such as smart community, smart transportation, and smart logistics. A basic architecture of the Internet of Things includes three layers: a sensing layer, a network layer, and an application layer. The sensing layer is actually an underlying technology, and is the beginning of everything in the Internet of Things. Data is mainly obtained by various sensors and is sent to the application layer via the network layer. The application layer processes the data and displays a processing result.

In a data transmission process, after downlink data of an Internet of Things user at an ultra-far point fails to be sent at a medium access control (MAC) layer, the downlink data needs to be retransmitted at a radio link control (RLC) layer. However, when an RLC status report is sent at the RLC layer, the RLC status report cannot carry negative acknowledgement (NACK-SN) information due to a limitation of an uplink scheduling resource, but can carry only acknowledgement (ACK-SN) information.

Because the NACK-SN information is lost, retransmission cannot be performed at the RLC layer in a timely manner based on the RLC status report. Consequently, a maximum quantity of retransmissions are performed at the RLC layer, resulting in a call drop.

SUMMARY

Embodiments of this application provide a data retransmission method and apparatus, to retransmit a lost data packet in a timely manner, thereby avoiding a call drop.

According to a first aspect, an embodiment of this application provides a retransmission method. The method includes a base station receives first ACK-SN information sent by a terminal, where the first ACK-SN information is included in an RLC status report, and the first ACK-SN information carries a sequence number of a first data packet. Then, the base station records the first ACK-SN information and a quantity of times of receiving the first ACK-SN information. If the quantity of times of receiving the first ACK-SN information reaches a preset value, the base station retransmits the first data packet to the terminal, where the preset value does not exceed a maximum quantity of retransmissions performed by the base station, and is greater than 1.

In this embodiment, the ACK-SN information is used to indicate a data packet receiving status of the terminal. For example, if the terminal receives a data packet whose sequence number is 1, ACK-SN information sent to the base station is "ACK-SN2 (used to indicate that the terminal receives a data packet whose sequence number is before 2)", if the terminal does not receive a data packet whose sequence number is 2 at a next moment (in other words, the data packet whose sequence number is 2 is lost), ACK-SN information sent to the base station is still "ACK-SN2", and if the terminal receives a data packet whose sequence number is 3 at a next moment, ACK-SN information sent to the base station is still "ACK-SN2". It can be learned from the foregoing case that the ACK-SN information may be used to indicate a sequence number of a lost data packet, so that the base station can effectively retransmit the lost data packet.

In this embodiment, the base station introduces repeated ACK-SN when a transmission resource of the status report is limited, to retransmit the lost data packet in a timely manner, thereby avoiding a call drop.

Optionally, after the quantity of times of receiving the first ACK-SN information reaches the preset value, the base station may alternatively allocate a target transmission resource to the status report, where the target transmission resource supports transmission of the status report carrying the ACK-SN information and NACK-SN information. Then, the base station receives the first ACK-SN information and the NACK-SN information that are sent by the terminal. Finally, the base station retransmits the first data packet to the terminal based on the first ACK-SN information and the NACK-SN information.

It may be understood that if the status report carries the ACK-SN information and the NACK-SN information, a specific case is as follows. If the terminal receives a data packet whose sequence number is 1, a status report returned by the terminal to the base station is "ACK-SN2", at a next moment, if the terminal does not receive a data packet whose sequence number is 2, a status report returned by the terminal to the base station is "ACK-SN2 and NACK-SN2 (used to indicate that the terminal receives a data packet whose sequence number is before 2, but does not receive the data packet whose sequence number is 2)", at a next moment, if the terminal receives a data packet whose sequence number is 3, a status report returned by the terminal to the base station is "ACK-SN4 and NACK-SN2 (used to indicate that the terminal receives data whose sequence number is before 4, but does not receive the data whose sequence number is 2)". In this way, a sequence number of a lost data packet can be effectively indicated, to effectively retransmit the lost data packet.

Optionally, in a process in which the base station receives the ACK-SN information returned by the terminal, if the quantity of times of receiving the first ACK-SN information does not reach the preset value, and the base station receives second ACK-SN information, where the second ACK-SN information carries a sequence number of a second data packet, the base station updates the first ACK-SN information as the second ACK-SN information, and records a quantity of times of receiving the second ACK-SN information. Then, when the quantity of times of receiving the second ACK-SN information accumulatively reaches the preset value, the base station retransmits the second data packet based on the second ACK-SN information.

It may be understood that the second ACK-SN information and the first ACK-SN information have a same function (both used to indicate a data packet receiving status of the terminal). However, the sequence number carried in the second ACK-SN information is different from the sequence number carried in the first ACK-SN information. In this embodiment, the data packet corresponding to the sequence number carried in the first ACK-SN information is not lost. Therefore, the base station may delete the first ACK-SN information in a timely manner, to effectively utilize a storage resource.

Optionally, after the first data packet is successfully retransmitted (in other words, the terminal successfully receives the lost data packet), the base station receives third ACK-SN information sent by the terminal. In this case, the third ACK-SN information carries a new sequence number that is used to indicate a data packet receiving status of the terminal. In this way, the base station may be notified of the data packet receiving status in a timely manner.

According to a second aspect, an embodiment of this application provides a data retransmission apparatus. The apparatus has a function of implementing behavior of the base station according to the first aspect. The function may be implemented by hardware, or may be implemented by hardware executing corresponding software. The hardware or the software includes one or more modules corresponding to the foregoing function.

In a possible implementation, the apparatus includes units or modules configured to perform the steps according to the first aspect. For example, the apparatus includes a receiving module, configured to receive first ACK-SN information sent by a terminal, where the first ACK-SN information is included in a status report, a processing module, configured to record the first ACK-SN information and a quantity of times of receiving the first ACK-SN information, and a retransmission module, configured to retransmit a first data packet to the terminal based on the first ACK-SN information when the quantity of times of receiving the first ACK-SN information accumulatively reaches a preset value, where the preset value does not exceed a maximum quantity of retransmissions.

Optionally, the apparatus further includes a storage module. The storage module is configured to store program instructions and data that are necessary for the base station.

In a possible implementation, the apparatus includes a processor and a transceiver. The processor is configured to support the base station in performing the corresponding functions in the method provided in the first aspect. The transceiver is configured to indicate communication between the base station and a terminal, and send information or instructions in the foregoing method to the terminal. Optionally, the apparatus may further include a memory. The memory is configured to be coupled to the processor, and stores program instructions and data that are necessary for the base station.

In a possible implementation, when the apparatus is a chip in the base station, the chip includes a processing module and a transceiver module. The processing module may be, for example, a processor. The processor is configured to record first ACK-SN information and a quantity of times of receiving the first ACK-SN information. The transceiver module may be, for example, an input/output interface, a pin, or a circuit on the chip, and transmits a first data packet (a to-be-retransmitted data packet) to another chip or module coupled to the chip. The processing module may execute computer-executable instructions stored in a storage unit, to support the base station in performing the method provided in the first aspect. Optionally, the storage unit may be a storage unit in the chip, for example, a register or a cache. The storage unit may alternatively be a storage unit that is located outside the chip, for example, a read-only memory (read-only memory, ROM for short) or another type of static storage device that can store static information and instructions or a random access memory (random access memory, RAM for short).

In a possible implementation, the apparatus includes a processor, a baseband circuit, a radio frequency circuit, and an antenna. The processor is configured to control functions of various circuit parts. The baseband circuit is configured to generate a to-be-retransmitted data packet. After the radio frequency circuit processes the to-be-retransmitted data packet, for example, by performing analog conversion, filtering, amplification, and up-conversion, the to-be-retransmitted data packet is sent to a terminal via the antenna. Optionally, the apparatus further includes a memory. The memory stores program instructions and data that are necessary for the base station.

The processor mentioned anywhere above may be a general-purpose central processing unit (CPU), a microprocessor, an application-specific integrated circuit (ASIC), or one or more integrated circuits configured to control program execution of the channel resource coordinated allocation method in the foregoing aspect.

According to a third aspect, an embodiment of this application provides a computer-readable storage medium. The computer storage medium stores computer instructions, and the computer instructions are used to perform the method according to any one of the possible implementations of the first aspect.

According to a fourth aspect, an embodiment of this application provides a computer program product including instructions. When the computer program product runs on a computer, the computer is enabled to perform the method according to any one of the possible implementations of the first aspect.

According to a fifth aspect, an embodiment of this application provides a communication system. The system includes the base station described in the foregoing aspects and a terminal.

It can be learned from the foregoing technical solutions that the embodiments of this application have the following advantages. The base station introduces the repeated ACK-SN when the transmission resource of the status report is limited, to retransmit the lost data packet in a timely manner, thereby avoiding a call drop.

DETAILED DESCRIPTION OF ILLUSTRATIVE EMBODIMENTS

Embodiments of this application provide a data retransmission method and apparatus, to retransmit a lost data packet in a timely manner, thereby avoiding a call drop.

In the specification, claims, and accompanying drawings of this application, the terms "first", "second", "third", "fourth", and the like (if existent) are intended to distinguish between similar objects but do not necessarily indicate a specific order or sequence. It should be understood that data used in such a way are interchangeable in proper circumstances, so that the embodiments described herein can be implemented in an order other than orders illustrated or described herein. Moreover, the terms "include", "comprise", and any other variants mean to cover non-exclusive inclusion, for example, a process, method, system, product, or device that includes a list of steps or units is not necessarily limited to those expressly listed steps or units, but may include other steps or units not expressly listed or inherent to such a process, method, product, or device.

Figure 1:
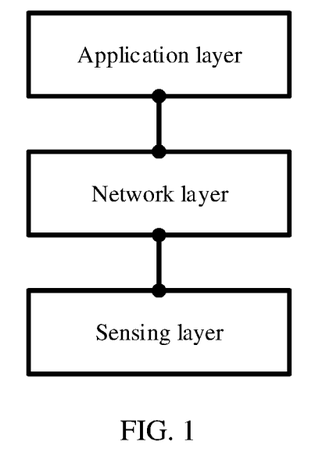
FIG. 1 is a diagram of a system architecture of the Internet of Things according to an embodiment of this application.

With rapid development of Internet technologies, the Internet of Things emerges. Currently, the Internet of Things has been extended from smart household to various fields such as smart community, smart transportation, and smart logistics. FIG. 1 shows a basic architecture of the Internet of Things. The Internet of Things includes three layers: a sensing layer, a network layer, and an application layer. The sensing layer is actually an underlying technology, and is the beginning of everything in the Internet of Things. Data is mainly obtained by various sensors and is sent to the application layer via the network layer. The application layer processes the data and displays a processing result. In a data transmission process, after downlink data of an Internet of Things user at an ultra-far point fails to be sent at a MAC layer, the downlink data needs to be retransmitted at an RLC layer. However, when an RLC status report is sent at the RLC layer, the RLC status report cannot carry NACK-SN information due to a limitation of an uplink scheduling resource, but can carry only ACK-SN information. Because the NACK-SN information is lost, retransmission cannot be performed at the RLC layer in a timely manner based on the RLC status report. Consequently, a maximum quantity of retransmissions are performed at the RLC layer, resulting in a call drop.

To resolve this problem, the embodiments of this application provide the following technical solution. A base station receives first ACK-SN information sent by a terminal, where the first ACK-SN information is included in an RLC status report. Then, the base station records the first ACK-SN information and a quantity of times of receiving the first ACK-SN information. If the quantity of times of receiving the first ACK-SN information reaches a preset value, the base station retransmits a first data packet to the terminal, where the preset value does not exceed a maximum quantity of retransmissions performed by the base station, and is greater than 1.

Figure 2:
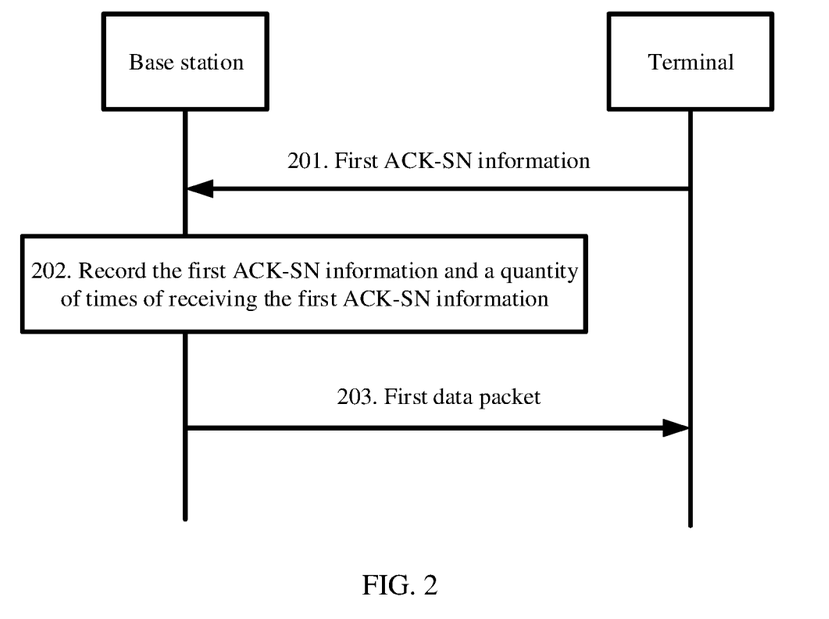
FIG. 2 is a schematic diagram of an embodiment of a data retransmission method according to embodiments of this application.

For details, refer to FIG. 2. An embodiment of a retransmission method in the embodiments of this application includes the following steps.

201. A base station receives first ACK-SN information sent by a terminal, where the first ACK-SN information is included in a status report, and the first ACK-SN information carries a sequence number of a first data packet.

In a data transmission process, after the base station sends a downlink data packet to the terminal, the terminal feeds back an acknowledgment message to the base station. In this embodiment of this application, the first ACK-SN information received by the base station is used for description. It may be understood that the ACK-SN information is used to indicate a data packet receiving status of the terminal. For example, if the terminal receives a data packet whose sequence number is 1, ACK-SN information sent to the base station is "ACK-SN2 (used to indicate that the terminal receives a data packet whose sequence number is before 2)", if the terminal does not receive a data packet whose sequence number is 2 at a next moment (in other words, the data packet whose sequence number is 2 is lost), ACK-SN information sent to the base station is still "ACK-SN2", and if the terminal receives a data packet whose sequence number is 3 at a next moment, ACK-SN information sent to the base station is still "ACK-SN2". It can be learned from the foregoing case that the ACK-SN information may be used to indicate a sequence number of a lost data packet, so that the base station can effectively retransmit the lost data packet.

202. The base station records the first ACK-SN information and a quantity of times of receiving the first ACK-SN information.

After receiving the first ACK-SN information, the base station records the first ACK-SN information, and counts the quantity of times of receiving the first ACK-SN information.

It may be understood that, in a process in which the base station receives the ACK-SN information sent by the terminal, the base station continuously receives the ACK-SN information. In this case, the base station may perform determining on each piece of ACK-SN information that is received. If the ACK-SN information is the same as ACK-SN information that is received at a previous moment, the quantity of times of receiving the ACK-SN information is increased by 1. This is cyclically performed in sequence. For example, if first ACK-SN information received by the base station at a first moment is "ACK-SN2", the base station records "ACK-SN2" and counts a quantity as 1. If ACK-SN information received by the base station at a second moment is "ACK-SN2", the base station updates the count of "ACK-SN2" as 2. If the ACK-SN information received by the base station at the second moment is "ACK-SN3", the base station deletes the record of "ACK-SN2", and updates the record as "ACK-SN3", where a count of "ACK-SN3" is 1.

203. When the quantity of times of receiving the first ACK-SN information reaches a preset value, the base station retransmits the first data packet to the terminal, where the preset value is greater than 1 and does not exceed a maximum quantity of retransmissions.

If the quantity of times of receiving the first ACK-SN information reaches the preset value, the base station retransmits the first data packet to the terminal, where the preset value is set to be greater than 1 and not to exceed the maximum quantity of retransmissions. For example, the preset value may be set to 3.

In a data transmission system, there is the maximum quantity of retransmissions. To avoid a call drop due to data packet loss, the base station needs to retransmit lost data to the terminal before the maximum quantity of retransmissions. Therefore, the preset value needs to be less than the maximum quantity of retransmissions.

Optionally, after the quantity of times of receiving the first ACK-SN information reaches the preset value, the base station may alternatively allocate a target transmission resource to the status report, where the target transmission resource supports transmission of the status report carrying the ACK-SN information and NACK-SN information. Then, the base station receives the first ACK-SN information and the NACK-SN information that are sent by the terminal. Finally, the base station retransmits the first data packet to the terminal based on the first ACK-SN information and the NACK-SN information.

It may be understood that if the status report carries the ACK-SN information and the NACK-SN information, a specific case is as follows. If the terminal receives a data packet whose sequence number is 1, a status report returned by the terminal to the base station is "ACK-SN2", at a next moment, if the terminal does not receive a data packet whose sequence number is 2, a status report returned by the terminal to the base station is "ACK-SN2 and NACK-SN2 (used to indicate that the terminal receives a data packet whose sequence number is before 2, but does not receive the data packet whose sequence number is 2)", at a next moment, if the terminal receives a data packet whose sequence number is 3, a status report returned by the terminal to the base station is "ACK-SN4 and NACK-SN2 (used to indicate that the terminal receives data whose sequence number is before 4, but does not receive the data whose sequence number is 2)". In this way, a sequence number of a lost data packet can be effectively indicated, to effectively retransmit the lost data packet.

Optionally, after the first data packet is successfully retransmitted (in other words, the terminal successfully receives the lost data packet), the base station receives third ACK-SN information sent by the terminal. In this case, the third ACK-SN information carries a new sequence number that is used to indicate a data packet receiving status of the terminal. In this way, the base station may be notified of the data packet receiving status in a timely manner.

In this embodiment, the base station introduces repeated ACK-SN when a transmission resource of the status report is limited, to retransmit the lost data packet in a timely manner, thereby avoiding a call drop.

The foregoing embodiment is described from a perspective of one piece of ACK-SN information. The following describes an embodiment of this application from a perspective of a plurality of pieces of ACK-SN information. For details, refer to FIG. 3. Another embodiment of a retransmission method in the embodiments of this application includes the following steps.

Figure 3:
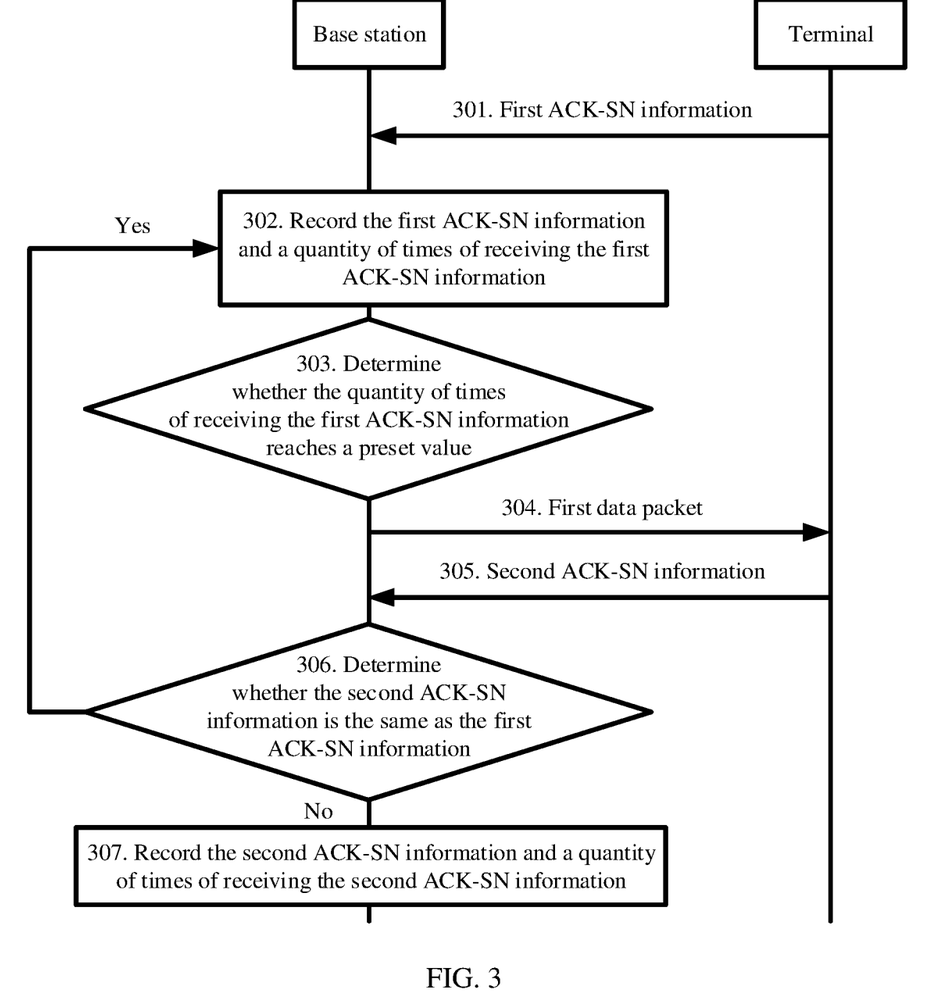
FIG. 3 is a schematic diagram of another embodiment of a data retransmission method according to embodiments of this application.

301. A base station receives first ACK-SN information sent by a terminal, where the first ACK-SN information is included in a status report, and the first ACK-SN information carries a sequence number of a first data packet.

In a data transmission process, after the base station sends a downlink data packet to the terminal, the terminal feeds back an acknowledgment message to the base station. In this embodiment of this application, the first ACK-SN information received by the base station is used for description. It may be understood that the ACK-SN information is used to indicate a data packet receiving status of the terminal. For example, if the terminal receives a data packet whose sequence number is 1, ACK-SN information sent to the base station is "ACK-SN2 (used to indicate that the terminal receives a data packet whose sequence number is before 2)", if the terminal does not receive a data packet whose sequence number is 2 at a next moment (in other words, the data packet whose sequence number is 2 is lost), ACK-SN information sent to the base station is still "ACK-SN2", and if the terminal receives a data packet whose sequence number is 3 at a next moment, ACK-SN information sent to the base station is still "ACK-SN2". It can be learned from the foregoing case that the ACK-SN information may be used to indicate a sequence number of a lost data packet, so that the base station can effectively retransmit the lost data packet.

302. The base station records the first ACK-SN information and a quantity of times of receiving the first ACK-SN information.

After receiving the first ACK-SN information, the base station records the first ACK-SN information, and counts the quantity of times of receiving the first ACK-SN information.

It may be understood that, in a process in which the base station receives the ACK-SN information sent by the terminal, the base station continuously receives the ACK-SN information. In this case, the base station may perform determining on each piece of ACK-SN information that is received. If the ACK-SN information is the same as ACK-SN information that is received at a previous moment, the quantity of times of receiving the ACK-SN information is increased by 1. This is cyclically performed in sequence. For example, if first ACK-SN information received by the base station at a first moment is "ACK-SN2", the base station records "ACK-SN2" and counts a quantity as 1. If ACK-SN information received by the base station at a second moment is "ACK-SN2", the base station updates the count of "ACK-SN2" as 2. If the ACK-SN information received by the base station at the second moment is "ACK-SN3", the base station deletes the record of "ACK-SN2", and updates the record as "ACK-SN3", where a count of "ACK-SN3" is 1.

303. The base station determines whether the quantity of times of receiving the first ACK-SN information reaches a preset value, and if yes, performs step 304, or if no, performs step 305, where the preset value is greater than 1 and does not exceed a maximum quantity of retransmissions.

304. The base station retransmits the first data packet to the terminal.

Because the quantity of times of receiving the first ACK-SN information reaches the preset value, the base station determines that the first data packet corresponding to the sequence number carried in the first ACK-SN information is lost, and the base station retransmits the first data packet to the terminal.

In a data transmission system, there is the maximum quantity of retransmissions. To avoid a call drop due to data packet loss, the base station needs to retransmit lost data to the terminal before the maximum quantity of retransmissions. Therefore, the preset value needs to be less than the maximum quantity of retransmissions.

Optionally, after the quantity of times of receiving the first ACK-SN information reaches the preset value, the base station may alternatively allocate a target transmission resource to the status report, where the target transmission resource supports transmission of the status report carrying the ACK-SN information and NACK-SN information. Then, the base station receives the first ACK-SN information and the NACK-SN information that are sent by the terminal. Finally, the base station retransmits the first data packet to the terminal based on the first ACK-SN information and the NACK-SN information.

It may be understood that if the status report carries the ACK-SN information and the NACK-SN information, a specific case is as follows. If the terminal receives a data packet whose sequence number is 1, a status report returned by the terminal to the base station is "ACK-SN2", at a next moment, if the terminal does not receive a data packet whose sequence number is 2, a status report returned by the terminal to the base station is "ACK-SN2 and NACK-SN2 (used to indicate that the terminal receives a data packet whose sequence number is before 2, but does not receive the data packet whose sequence number is 2)", at a next moment, if the terminal receives a data packet whose sequence number is 3, a status report returned by the terminal to the base station is "ACK-SN4 and NACK-SN2 (used to indicate that the terminal receives data whose sequence number is before 4, but does not receive the data whose sequence number is 2)". In this way, a sequence number of a lost data packet can be effectively indicated, to effectively retransmit the lost data packet.

Optionally, after the first data packet is successfully retransmitted (in other words, the terminal successfully receives the lost data packet), the base station receives third ACK-SN information sent by the terminal. In this case, the third ACK-SN information carries a new sequence number that is used to indicate a data packet receiving status of the terminal. In this way, the base station may be notified of the data packet receiving status in a timely manner.

305. The base station receives second ACK-SN information sent by the terminal.

The base station receives the second ACK-SN information sent by the terminal at a next moment, where the second ACK-SN information also carries a sequence number of a data packet and is included in a status report.

306. The base station determines whether the second ACK-SN information is the same as the first ACK-SN information, and if the second ACK-SN information is different from the first ACK-SN information, performs step 307, or if the second ACK-SN information is the same as the first ACK-SN information, performs step 302.

The base station determines whether the data packet sequence number carried in the second ACK-SN information is the same as the data packet sequence number carried in the first ACK-SN information. If the data packet sequence number carried in the second ACK-SN information is the same as the data packet sequence number carried in the first ACK-SN information, the second ACK-SN information is the same as the first ACK-SN information, or if the data packet sequence number carried in the second ACK-SN information is different from the data packet sequence number carried in the first ACK-SN information, the second ACK-SN information is different from the first ACK-SN information. When the second ACK-SN information is different from the first ACK-SN information, the base station performs step 307, or when the second ACK-SN information is the same as the first ACK-SN information, the base station repeatedly performs step 302.

307. The base station updates the first ACK-SN information as the second ACK-SN information, and records a quantity of times of receiving the second ACK-SN information.

After the base station determines that the second ACK-SN information is different from the first ACK-SN information, the base station determines that the data packet corresponding to the sequence number carried in the first ACK-SN information has been received by the terminal. In this case, the base station updates the first ACK-SN information as the second ACK-SN information, and recounts the quantity of times of receiving the second ACK-SN information.

It may be understood that, when the quantity of times of receiving the second ACK-SN information reaches the preset value, the base station may retransmit a second data packet corresponding to the sequence number carried in the second ACK-SN information. It can be learned from the foregoing embodiment that the base station may cyclically perform step 301 to step 306 on the ACK-SN information.

In this embodiment, the base station introduces repeated ACK-SN when a transmission resource of the status report is limited, to retransmit the lost data packet in a timely manner, thereby avoiding a call drop.

The foregoing describes the data retransmission method in the embodiments of this application, and the following describes the retransmission apparatus in the embodiments of this application.

Figure 4:
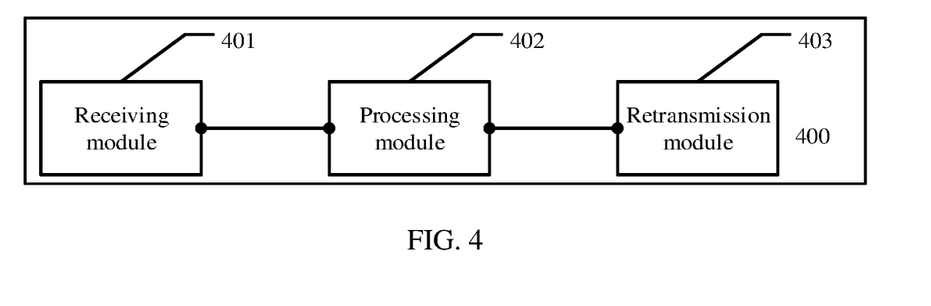
FIG. 4 is a schematic diagram of an embodiment of a data retransmission apparatus according to embodiments of this application.

In this embodiment of this application, a data retransmission apparatus 400 includes a receiving module 401, a processing module 402, and a retransmission module 403. The apparatus 400 may be the base station in the foregoing method embodiments, or may be one or more chips in the base station. The apparatus 400 may be configured to perform some or all functions of the base station in the foregoing method embodiments.

For example, the receiving module 401 may be configured to perform step 201 in the foregoing method embodiments, or configured to perform step 301 and step 305 in the foregoing method embodiments. The processing module 402 may be configured to perform step 202 in the foregoing method embodiments, or configured to perform step 302, step 303, step 305, and step 306 in the foregoing method embodiments. The retransmission module 403 may be configured to perform step 203 in the foregoing method embodiments, or configured to perform step 304 in the foregoing method embodiments. For example, the receiving module 401 is configured to receive first ACK-SN information sent by a terminal, where the first ACK-SN information is included in a status report, the processing module 402 is configured to record the first ACK-SN information and a quantity of times of receiving the first ACK-SN information, and the retransmission module 403 is configured to retransmit a first data packet to the terminal based on the first ACK-SN information when the quantity of times of receiving the first ACK-SN information accumulatively reaches a preset value, where the preset value does not exceed a maximum quantity of retransmissions.

Optionally, the processing module 402 is configured to allocate a target transmission resource to the status report when the quantity of times of receiving the ACK-SN information accumulatively reaches the preset value, where the target transmission resource supports transmission of the status report carrying the ACK-SN information and NACK-SN information.

The receiving module 401 is further configured to receive the first ACK-SN information and the NACK-SN information that are sent by the terminal.

The retransmission module 403 is configured to retransmit the first data packet to the terminal based on the first ACK-SN information and the NACK-SN information.

Optionally, the apparatus 400 further includes a storage module. The storage module is coupled to the processing module, so that the processing module can execute computer-executable instructions stored in the storage module, to implement functions of the base station in the foregoing method embodiments. In an example, the storage module optionally included in the apparatus 400 may be a storage unit in a chip, for example, a register or a cache. The storage module may alternatively be a storage unit that is located outside the chip, for example, a read-only memory (read-only memory, ROM for short), another type of static storage device that can store static information and instructions, or a random access memory (random access memory, RAM for short).

It should be understood that a procedure performed by the modules of the data retransmission apparatus in the embodiment corresponding to FIG. 4 is similar to the procedure performed by the base station in the method embodiments corresponding to FIG. 2 and FIG. 3. Details are not described herein again.

Figure 5:
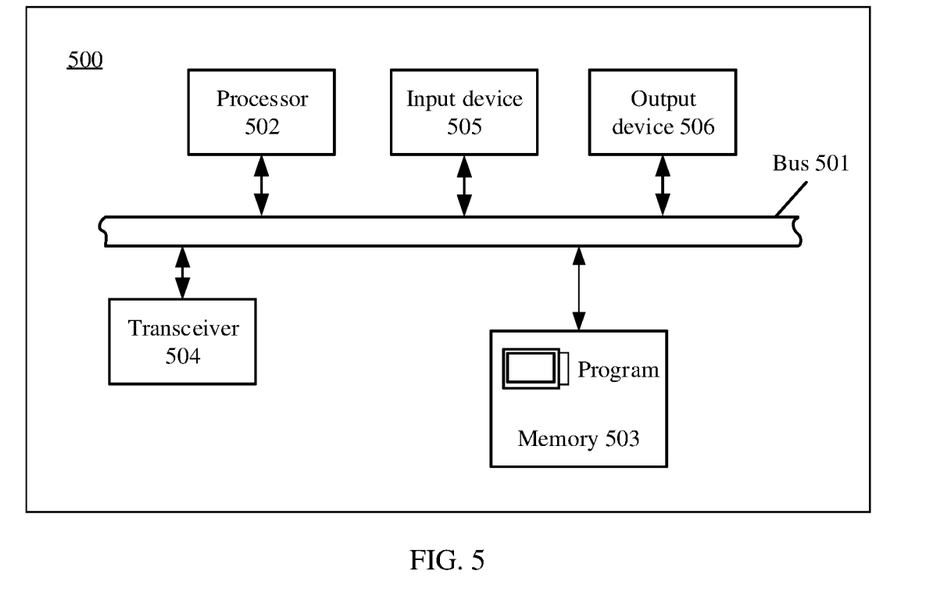
FIG. 5 is a schematic diagram of another embodiment of a data retransmission apparatus according to embodiments of this application.

FIG. 5 is a possible schematic diagram of a structure of a data retransmission apparatus 500 according to the foregoing embodiment. The apparatus 500 may be configured as the foregoing base station. The apparatus 500 may include a processor 502, a computer-readable storage medium/memory 503, a transceiver 504, an input device 505, an output device 506, and a bus 501. The processor, the transceiver, the computer-readable storage medium, and the like are connected via the bus. A specific connection medium between the foregoing components is not limited in this embodiment of this application.

In an example, the transceiver 504 is configured to receive first ACK-SN information sent by a terminal, where the first ACK-SN information is included in a status report, and the first ACK-SN information carries a sequence number of a first data packet.

The processor 502 is configured to record the first ACK-SN information and a quantity of times of receiving the first ACK-SN information.

The transceiver 504 is configured to retransmit the first data packet to the terminal based on the first ACK-SN information when the quantity of times of receiving the first ACK-SN information accumulatively reaches a preset value, where the preset value does not exceed a maximum quantity of retransmissions.

In an example, the processor 502 may include a baseband circuit. For example, the processor 502 may perform data encapsulation, encoding, or the like on data according to a protocol, to generate a data packet. The transceiver 504 may include a radio frequency circuit, to perform processing, for example, modulation and amplification, on the data packet and send the data packet to the terminal.

In another example, the processor 502 may run an operating system to control a function between each device and each component. The transceiver 504 may include a baseband circuit and a radio frequency circuit. For example, the transceiver 504 may process a data packet by using the baseband circuit and the radio frequency circuit, and then send the data packet to the terminal.

The transceiver 504 and the processor 502 may implement a corresponding step in any one of the embodiments in FIG. 2 and FIG. 3. Details are not described herein again.

It may be understood that FIG. 5 shows only a simplified design of the base station. In an actual application, the base station may include any quantity of transceivers, processors, memories, and the like, and all base stations that can implement this application fall within the protection scope of this application.

The processor 502 in the apparatus 500 may be a general-purpose processor, for example, a general-purpose central processing unit (CPU), a network processor (network processor, NP), or a microprocessor, or may be an application-specific integrated circuit (ASIC) or one or more integrated circuits configured to control program execution of the solutions of this application. Alternatively, the processor 502 may be a digital signal processor (DSP), a field-programmable gate array (FPGA) or another programmable logic device, a discrete gate or a transistor logic device, or a discrete hardware component. Alternatively, a controller/the processor may be a combination of processors implementing a computing function, for example, a combination of one or more microprocessors, or a combination of the DSP and the microprocessor. The processor usually performs logical and arithmetic operations based on program instructions stored in the memory.

The bus 501 may be a peripheral component interconnect (PCI) bus, an extended industry standard architecture (EISA for short) bus, or the like. The bus may be classified into an address bus, a data bus, a control bus, and the like. For ease of representation, only one thick line is used to represent the bus in FIG. 5, but this does not mean that there is only one bus or only one type of bus.

The computer-readable storage medium/memory 503 may further store the operating system and another application program. Specifically, the program may include program code, and the program code includes computer operation instructions. More specifically, the memory may be a read-only memory (ROM), another type of static storage device that can store static information and instructions, a random access memory (RAM), another type of dynamic storage device that can store information and instructions, a magnetic disk memory, or the like. The memory 503 may be a combination of the foregoing memories. In addition, the computer-readable storage medium/memory may be located in the processor, or may be located outside the processor, or distributed in a plurality of entities including the processor or a processing circuit. The computer-readable storage medium/memory may be specifically embodied in a computer program product. For example, the computer program product may include a computer-readable medium in a packaging material.

Alternatively, an embodiment of this application further provides a universal processing system. For example, the universal processing system is usually referred to as a chip. The universal processing system includes one or more microprocessors that provide a processor function and an external memory that provides at least a part of a storage medium. All these components are connected to other supporting circuits by using an external bus architecture. When instructions stored in the memory are executed by the processor, the processor is enabled to perform some or all of the steps of the data retransmission method performed by the base station in the embodiments of FIG. 2 and FIG. 3, and/or another process of the technology described in this application.

The method or algorithm steps described with reference to the content disclosed in this application may be implemented by hardware, or may be implemented by a processor executing software instructions. The software instructions may be formed by a corresponding software module. The software module may be located in a RAM memory, a flash memory, a ROM memory, an electrically programmable ROM (EPROM) memory, an electrically erasable programmable ROM (EEPROM) memory, a register, a hard disk, a removable magnetic disk, a compact disc ROM (CD-ROM), or a storage medium of any other form known in the art. For example, a storage medium is coupled to the processor, so that the processor can read information from the storage medium or write information into the storage medium. Certainly, the storage medium may alternatively be a component of the processor. The processor and the storage medium may be located in an ASIC. In addition, the ASIC may be located in user equipment. Certainly, the processor and the storage medium may exist as discrete components in the user equipment.

Figure 6:
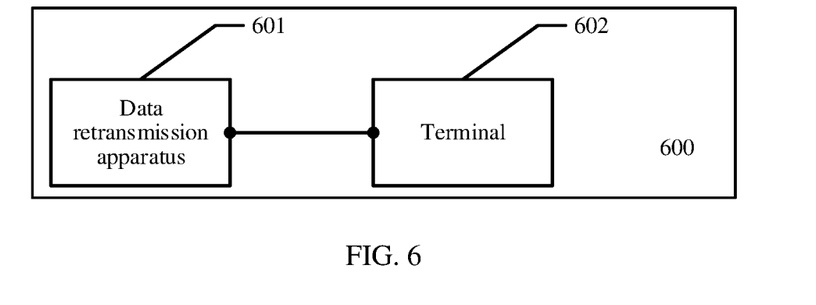
FIG. 6 is a schematic diagram of an embodiment of a communication system according to embodiments of this application.

Specifically, refer to FIG. 6. An embodiment of a communication system according to embodiments of this application includes a data retransmission apparatus 601 and a terminal 602.

The data retransmission apparatus 601 and the terminal 602 implement data transmission by using a network system.

The data retransmission apparatus 601 has all functions of the base station in FIG. 2 and FIG. 3, and the terminal 602 has all functions of the terminal in FIG. 2 and FIG. 3.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, in other words, may be located in one location, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A data retransmission method, comprising:
   receiving, by a base station, first acknowledgement sequence number (ACK-SN) information sent by a terminal, wherein the first ACK-SN information is disposed in a status report for which a first target transmission resource is allocated for carrying the ACK-SN and without carrying negative acknowledgement sequence number (NACK-SN) information, and wherein the first ACK-SN information carries a sequence number of a first data packet;
   recording, by the base station, the first ACK-SN information and a quantity of times the first ACK-SN information is received; and
   retransmitting, by the base station, the first data packet to the terminal based on the first ACK-SN information in response to the quantity of times the first ACK-SN information is received accumulatively reaching a preset value, wherein the preset value is less than or equal to a maximum quantity of retransmissions associated with avoiding a call being dropped due to data packet loss, and wherein the preset value is greater than 1.

2. The method according to claim 1, further comprising:
   allocating, by the base station, a second target transmission resource to the status report in response to the quantity of times the first ACK-SN information is received accumulatively reaching the preset value, wherein the second target transmission resource supports transmission of the status report carrying the first ACK-SN information and negative acknowledgement sequence number (NACK-SN) information;
   receiving, by the base station, the first ACK-SN information and the NACK-SN information that are sent by the terminal; and
   retransmitting, by the base station, the first data packet to the terminal based on the first ACK-SN information and the NACK-SN information.

3. The method according to claim 1, further comprising:
   receiving, in response to the quantity of times the first ACK-SN information is received not accumulatively reaching the preset value, second ACK-SN information sent by the terminal, wherein the second ACK-SN information carries a sequence number of a second data packet, and
   updating, by the base station, the first ACK-SN information as the second ACK-SN information;
   recording a quantity of times the second ACK-SN information is received; and
   retransmitting, by the base station, the second data packet to the terminal based on the second ACK-SN information in response to the quantity of times the second ACK-SN information is received accumulatively reaching the preset value.

4. The method according to claim 3, wherein the sequence number of the second data packet indicates that the second data packet is later in a transmission sequence than the first data packet.

5. The method according to claim 3, wherein the sequence number of the second data packet in the second ACK-SN indicates that the first data packet was successfully received.

6. The method according to claim 1, further comprising:
   receiving, by the base station after the first data packet is successfully retransmitted, third ACK-SN information sent by the terminal.

7. The method according to claim 1, wherein the sequence number that is of the first data packet and that is disposed the first ACK-SN information indicates that a data packet preceding the first data packet in a transmission sequence has been received, and that the first data packet has not been received.

8. A data retransmission apparatus, comprising:
a processor;
non-transitory memory coupled to the processor, the memory storing instructions that, when executed by the processor, cause the apparatus to:
receive first acknowledgement sequence number (ACK-SN) information sent by a terminal, wherein the first ACK-SN information is disposed in a status report for which a first target transmission resource is allocated for carrying the ACK-SN and without carrying negative acknowledgement sequence number (NACK-SN) information, and wherein the first ACK-SN information carries a sequence number of a first data packet;
record the first ACK-SN information and a quantity of times the first ACK-SN information is received; and
retransmit the first data packet to the terminal based on the first ACK-SN information in response to the quantity of times the first ACK-SN information is received accumulatively reaching a preset value, wherein the preset value is less than or equal to a maximum quantity of retransmissions associated with avoiding a call being dropped due to data packet loss, and wherein the preset value is greater than 1.

9. The apparatus according to claim 8, wherein the instructions, when executed by the processor, further cause the apparatus to:
allocate a second target transmission resource to the status report in response to the quantity of times the first ACK-SN information is received accumulatively reaching the preset value, wherein the second target transmission resource supports transmission of the status report carrying the first ACK-SN information and negative acknowledgement sequence number (NACK-SN) information;
receive the first ACK-SN information and the NACK-SN information that are sent by the terminal; and
retransmit the first data packet to the terminal based on the first ACK-SN information and the NACK-SN information.

10. The apparatus according to claim 8, wherein the instructions, when executed by the processor, further cause the apparatus to:
receive, in response to the quantity of times the first ACK-SN information is received not accumulatively reaching the preset value, second ACK-SN information sent by the terminal, wherein the second ACK-SN information carries a sequence number of a second data packet;
update the first ACK-SN information as the second ACK-SN information;
record a quantity of times the second ACK-SN information is received; and
retransmit the second data packet to the terminal based on the second ACK-SN information in response to the quantity of times the second ACK-SN information is received accumulatively reaching the preset value.

11. The apparatus according to claim 10, wherein the sequence number of the second data packet indicates that the second data packet is later in a transmission sequence than the first data packet.

12. The apparatus according to claim 10, wherein the sequence number of the second data packet in the second ACK-SN indicates that the first data packet was successfully received.

13. The apparatus according to claim 8, wherein the instructions, when executed by the processor, further cause the apparatus to receive, after the first data packet is successfully retransmitted, third ACK-SN information sent by the terminal.

14. The apparatus according to claim 8, wherein the sequence number that is of the first data packet and that is disposed the first ACK-SN information indicates that a data packet preceding the first data packet in a transmission sequence has been received, and that the first data packet has not been received.

15. A non-transitory computer-readable storage medium storing computer instructions for execution by a processor, the computer instructions including instructions for:
receiving, by a base station, first acknowledgement sequence number (ACK-SN) information sent by a terminal, wherein the first ACK-SN information is disposed in a status report for which a first target transmission resource is allocated for carrying the ACK-SN and without carrying negative acknowledgement sequence number (NACK-SN) information, and wherein the first ACK-SN information carries a sequence number of a first data packet;
recording, by the base station, the first ACK-SN information and a quantity of times the first ACK-SN information is received; and
retransmitting, by the base station, the first data packet to the terminal based on the first ACK-SN information in response to the quantity of times the first ACK-SN information is received accumulatively reaching a preset value, wherein the preset value is less than or equal to a maximum quantity of retransmissions associated with avoiding a call being dropped due to data packet loss, and wherein the preset value is greater than 1.

16. The non-transitory computer-readable storage medium according to claim 15, the computer instructions further including instructions for:
allocating, by the base station, a second target transmission resource to the status report in response to the quantity of times the first ACK-SN information is received accumulatively reaching the preset value, wherein the second target transmission resource supports transmission of the status report carrying the first ACK-SN information and negative acknowledgement sequence number (NACK-SN) information;
receiving, by the base station, the first ACK-SN information and the NACK-SN information that are sent by the terminal; and
retransmitting, by the base station, the first data packet to the terminal based on the first ACK-SN information and the NACK-SN information.

17. The non-transitory computer-readable storage medium according to claim 15, the computer instructions further including instructions for:
receiving, in response to the quantity of times the first ACK-SN information is received not accumulatively reaching the preset value, second ACK-SN information sent by the terminal, wherein the second ACK-SN information carries a sequence number of a second data packet, and
updating, by the base station, the first ACK-SN information as the second ACK-SN information;

recording a quantity of times the second ACK-SN information is received; and retransmitting, by the base station, the second data packet to the terminal based on the second ACK-SN information in response to the quantity of times the second ACK-SN information is received accumulatively reaching the preset value.

18. The non-transitory computer-readable storage medium according to claim 17, wherein the sequence number of the second data packet indicates that the second data packet is later in a transmission sequence than the first data packet and that the first data packet was successfully received.

19. The non-transitory computer-readable storage medium according to claim 15, the computer instructions further including instructions for:

receiving, by the base station after the first data packet is successfully retransmitted, third ACK-SN information sent by the terminal.

20. The non-transitory computer-readable storage medium according to claim 15, wherein the sequence number that is of the first data packet and that is disposed the first ACK-SN information indicates that a data packet preceding the first data packet in a transmission sequence has been received, and that the first data packet has not been received.

* * * * *